United States Patent
Frankenberger et al.

(10) Patent No.: US 10,035,294 B2
(45) Date of Patent: Jul. 31, 2018

(54) SLOP-OVER PREVENTION IN FORM-FILLING MACHINES

(71) Applicant: KRONES AG, Neutraubling (DE)

(72) Inventors: Günter Frankenberger, Köfering (DE); Harald Wels, Neutraubling (DE); Thomas Albrecht, Beilngries (DE)

(73) Assignee: KRONES AG, Neutraubling (DE)

( * ) Notice: Subject to any disclaimer, the term of this patent is extended or adjusted under 35 U.S.C. 154(b) by 73 days.

(21) Appl. No.: 14/827,899

(22) Filed: Aug. 17, 2015

(65) Prior Publication Data

US 2016/0052190 A1 Feb. 25, 2016

(30) Foreign Application Priority Data

Aug. 20, 2014 (EP) .................................... 14181650

(51) Int. Cl.
| | |
|---|---|
| B29C 49/46 | (2006.01) |
| B65G 47/84 | (2006.01) |
| B65B 3/02 | (2006.01) |
| B67B 3/00 | (2006.01) |
| B67C 7/00 | (2006.01) |
| B29C 49/42 | (2006.01) |
| B65G 47/86 | (2006.01) |
| B29K 105/00 | (2006.01) |
| B29L 31/00 | (2006.01) |

(52) U.S. Cl.
CPC ............ *B29C 49/46* (2013.01); *B29C 49/421* (2013.01); *B29C 49/4273* (2013.01); *B65B 3/022* (2013.01); *B65G 47/847* (2013.01); *B67B 3/00* (2013.01); *B67C 7/0046* (2013.01); *B29C 2049/4664* (2013.01); *B29K 2105/258* (2013.01); *B29L 2031/7158* (2013.01)

(58) Field of Classification Search
CPC ................................. B29C 2049/4664; B29C 2049/4652–2049/4658; B29C 49/421; B29C 49/4273; B65B 21/183; B65B 3/022; B65G 47/842
See application file for complete search history.

(56) References Cited

U.S. PATENT DOCUMENTS

| | | | |
|---|---|---|---|
| 8,776,988 B2 * | 7/2014 | van der Vliet | B65G 23/20 198/470.1 |
| 2011/0031659 A1 | 2/2011 | Warner et al. | |

(Continued)

FOREIGN PATENT DOCUMENTS

| | | |
|---|---|---|
| DE | 102011115512 A1 | 4/2013 |
| EP | 1529620 B1 | 2/2009 |

(Continued)

OTHER PUBLICATIONS

European Search Report for application No. 14181650.4, dated Feb. 20, 2015.

*Primary Examiner* — William P Bell
(74) *Attorney, Agent, or Firm* — Marshall, Gerstein & Borun LLP (57) ABSTRACT

A form-filling machine for molding and filling a plastic preform with a liquid in a treatment station, including a slop-over protection device to prevent a liquid from slopping out of the container, including during the transition of the container filled with the liquid out of the treatment station of form-filling machine into a discharge unit, such as a discharge star wheel.

3 Claims, 7 Drawing Sheets

(56) References Cited

U.S. PATENT DOCUMENTS

| | | | | |
|---|---|---|---|---|
| 2012/0260955 A1* | 10/2012 | Winzinger | .......... | B29C 49/4205 |
| | | | | 134/43 |
| 2012/0266567 A1* | 10/2012 | Haesendonckx | ....... | B65B 3/022 |
| | | | | 53/456 |
| 2013/0026005 A1* | 1/2013 | Senn | .................... | B65G 47/082 |
| | | | | 198/465.2 |
| 2014/0157734 A1* | 6/2014 | Chauvin | ................. | B65B 3/022 |
| | | | | 53/574 |
| 2014/0251766 A1* | 9/2014 | Fahldieck | ............. | B67C 7/0046 |
| | | | | 198/803.3 |
| 2015/0021833 A1* | 1/2015 | Chauvin | ................. | B29C 49/12 |
| | | | | 264/524 |
| 2016/0059469 A1* | 3/2016 | Diesnis | ................... | B65B 3/022 |
| | | | | 215/40 |
| 2016/0250798 A1* | 9/2016 | Diesnis | ................... | B65B 3/022 |
| | | | | 425/524 |

FOREIGN PATENT DOCUMENTS

| | | | |
|---|---|---|---|
| EP | 2179960 A1 | 4/2010 | |
| JP | 2009269660 A | 11/2009 | |
| WO | WO-9855390 A1 | 12/1998 | |
| WO | WO-2011007370 A1 | 1/2011 | |
| WO | WO-2013/053417 A1 | 4/2013 | |
| WO | WO-2013117492 A1 | 8/2013 | |

* cited by examiner

SLOP-OVER PREVENTION IN FORM-FILLING MACHINES

CROSS-REFERENCE TO RELATED APPLICATION

The present application claims priority to European Application No. 14 181 650.4, filed Aug. 20, 2014. The priority application, EP 14 181 650.4 is hereby incorporated by reference.

FIELD OF THE DISCLOSURE

The disclosure relates to a form-filling machine to mold and fill a plastic container with a liquid in a treatment station.

BACKGROUND

As known, plastic containers can be manufactured out of preforms in a blow molding process.

As an alternative to inflating the containers with pressurized air, the EP 1529620 B1 describes a process for hydraulic reshaping of preforms into plastic bottles. For this purpose, the preforms are at first heated, brought into a hollow mold and stretched there in a longitudinal direction. Further, a fluid or the like is added in order to produce the final container shape. The fluid corresponds to the liquid remaining in the container and consequently remains in the container so that a subsequent separate bottling process can be omitted.

The US 2011/0031659 A1 further describes a process in which a heated preform is stretched by means of a stretching rod and subsequently dilated hydraulically into a container by means of an incompressible fluid, in particular water. Afterwards, the fluid is displaced by pressurized air and flows out of the container.

A form-filling machine, according to its definition, comprises at least one treatment station for the expanding reshaping process of plastic preforms into plastic containers in a hollow mold and for filling a substantially liquid product or at least a liquid or solid component of the products into the plastic containers.

Liquids, even those that contain dissolved carbon dioxide or the like, are, by definition and with regard to their function during molding and filling of the containers, incompressible fluids in contrast to gases that are functionally defined as compressible fluids.

After molding and filling of the containers with the product in the treatment station, a filled container has to be transported out of the carousel. Discharge systems according to the state of the art work with a traditional transfer star wheel. A partition delay star wheel can also be used as an alternative. Due to the extensive partition and the related speed, the problem of the product slopping over during the transfer and/or shortly after the transfer into the discharge star wheel has a stronger relevance compared to a traditional filling machine outlet.

SUMMARY OF THE DISCLOSURE

One aspect of the present disclosure concerns advancing known devices and processes for molding and filling of plastic containers in an advantageous way, and particularly concerns overcoming the above disadvantages according to the state of the art by preventing a slop-over effect of the product.

The form-filling machine according to the present disclosure is designed for molding and filling of a plastic preform with a liquid in a treatment station and includes a slop-over protection device that is suitable to prevent slop-over of a liquid off the container, in particular during transfer of the container filled with the liquid from the treatment station of the form-filling machine into an outlet system, in particular a discharge star wheel. Therefore, the slop-over protection device is developed in a way that slop-over of the liquid in the container out of the aperture of the container is prevented due to direction changes in the path of the container and resulting acceleration forces.

The slop-over protection device can comprise a closure unit to put a closure, in particular a pre-closure, onto the outlet of the container molded in the treatment station and filled with liquid. With the closure unit, a closure is placed onto the outlet of the filled container by means of the closure unit after molding and filling of the container, whereby slop-over of the liquid during transfer into the discharge system is prevented.

The closure can have at least one gas exchange aperture whereby the at least single gas exchange aperture is preferably installed as a slot on one edge of the closure and/or as a star-shaped or cross-shaped slot in the closure, in particular in the center of the closure. The closure is to be understood in the sense of a pre-closure that is placed upon the outlet. When blowing with a hot product takes place and the liquid cools down on the transportation path in the treatment station, there will be a slight negative pressure that keeps the closure on the outlet. The closure preferably has small venting and ventilation apertures and/or ventilation slots through which—in alignment with the blowing temperature and the container strength—a defined gas exchange is allowed during cooling so that the container will not collapse due to the emerging negative pressure. Such a closure in the sense of a pre-closure can be taken back off prior to the placement of the final closure and transferred back to the form-filling machine or also remain on the container that will then be closed with a final closing cap.

The closure can be developed as a cap or the closure can comprise a foil that can be welded or glued onto the outlet with the closure unit, or the closure can comprise a plug that is pressed into the outlet.

The slop-over protection device can comprise at least one swivel bracket for a tiltable support of the container in the discharge star wheel with an inclination in relation to the vertical plane. As the form-filling machine always runs with the same speed, the type and structure of the liquid surface is always nearly identical for a specific product. Due to this specific structure and by means of a discharge star wheel, in which the container, which is defined with an inclination of the liquid surface that is going to emerge, swivels along, a slop-over effect can be prevented.

This can be further developed by means of installing a control unit to emit a control signal to control the inclination of the swivel bracket alongside a discharge path of the discharge star wheel and/or a camera to monitor and readjust the inclination.

Alternatively, the inclination can adjust itself due to the centripetal and gravitational force that impacts on the container, or the inclination can be predefined alongside a discharge path of the discharge unit due to a mechanical guiding system in the discharge star wheel.

As an alternative, the slop-over protection system can comprise a discharge path of the containers in the discharge unit, that deviates from the circular path, in particular with a section of the discharge path that extends from a transfer point between the treatment station and the discharge unit in a tangential direction. This way, the centripetal force acting in the treatment station being transformed into an opposite centripetal force in the discharge star wheel can be avoided whereby the slop-over effect is reduced. A gradual transition from the curvature of the circular path in the treatment station to an opposite curvature of the discharge path is particularly preferred. In other words, a part of the discharge path still continues after the transfer point with a curvature direction as prior to the transfer.

Such a slop-over protection device can be set up, for example, if the slop-over protection device continues to comprise at least one bracket for the container, that is arranged tiltably around a pivot point, whereby a distance of the supported container and the pivot point is variable, in particular by means of a connection element with an adjustable length. This corresponds to a multi-axis discharge star wheel with an adjustable radius.

Alternatively, the discharge unit can comprise several single carriages for the respective input of a container, whereby the single carriages are arranged on at least one conveyor rail and whereby the speed of each single carriage can be controlled separately. This way, each single carriage can move along the predefined path (preferably driven individually or connected by a strap or a belt). Not only the path course but also the speed and acceleration progression can thereby be adapted and variable. This way, the centrifugal force that impacts on the liquid in the container, in particular its maximum values, can be minimized in the course of the discharge path.

The mentioned embodiments can be used individually or combined with each other as claimed in an appropriate way.

Further characteristics and exemplary variants as well as benefits of the present disclosure are explained in greater detail by means of the following drawings. It is clear that the variants are non-exhaustive examples to illustrate the field of the present disclosure. Further, it is clear that some or all of the characteristics described in the following can also be combined with each other in a different manner.

DETAILED DESCRIPTION

Figure 1:
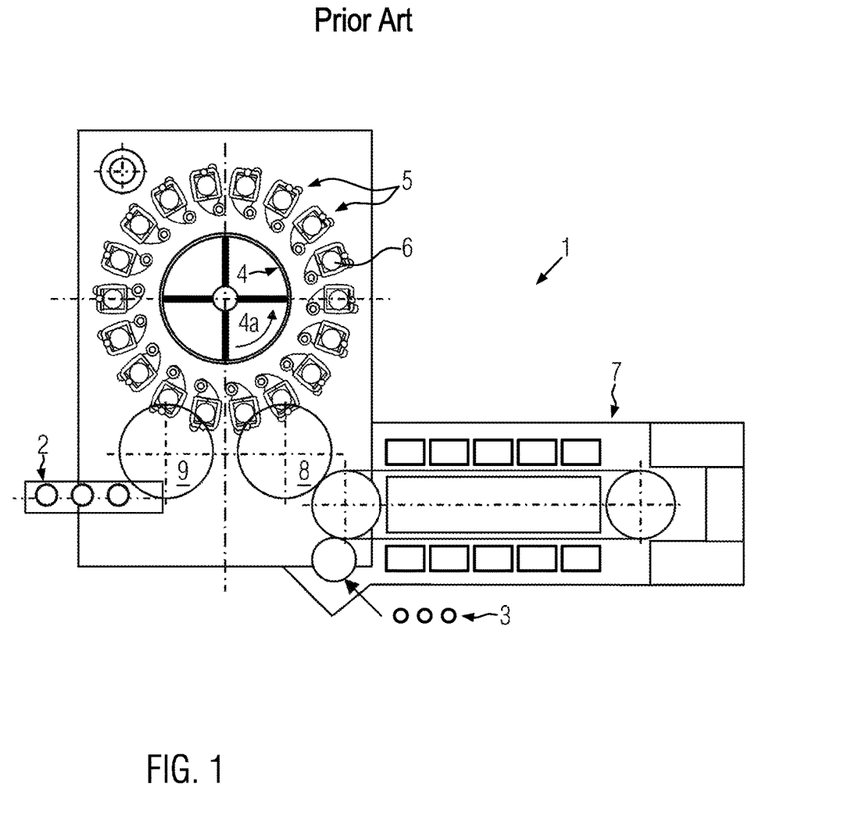
FIG. 1 shows a form-filling machine according to the state of the art

FIG. 1 shows a form-filling machine 1 according to the state of the art.

The following are shown as components of the form-filling machine: container 2, preform 3, carousel 4 (with a continuous transportation movement 4a), treatment station 5, hollow mold 6, furnace 7, input star wheel 8, discharge star wheel 9.

Figure 2:
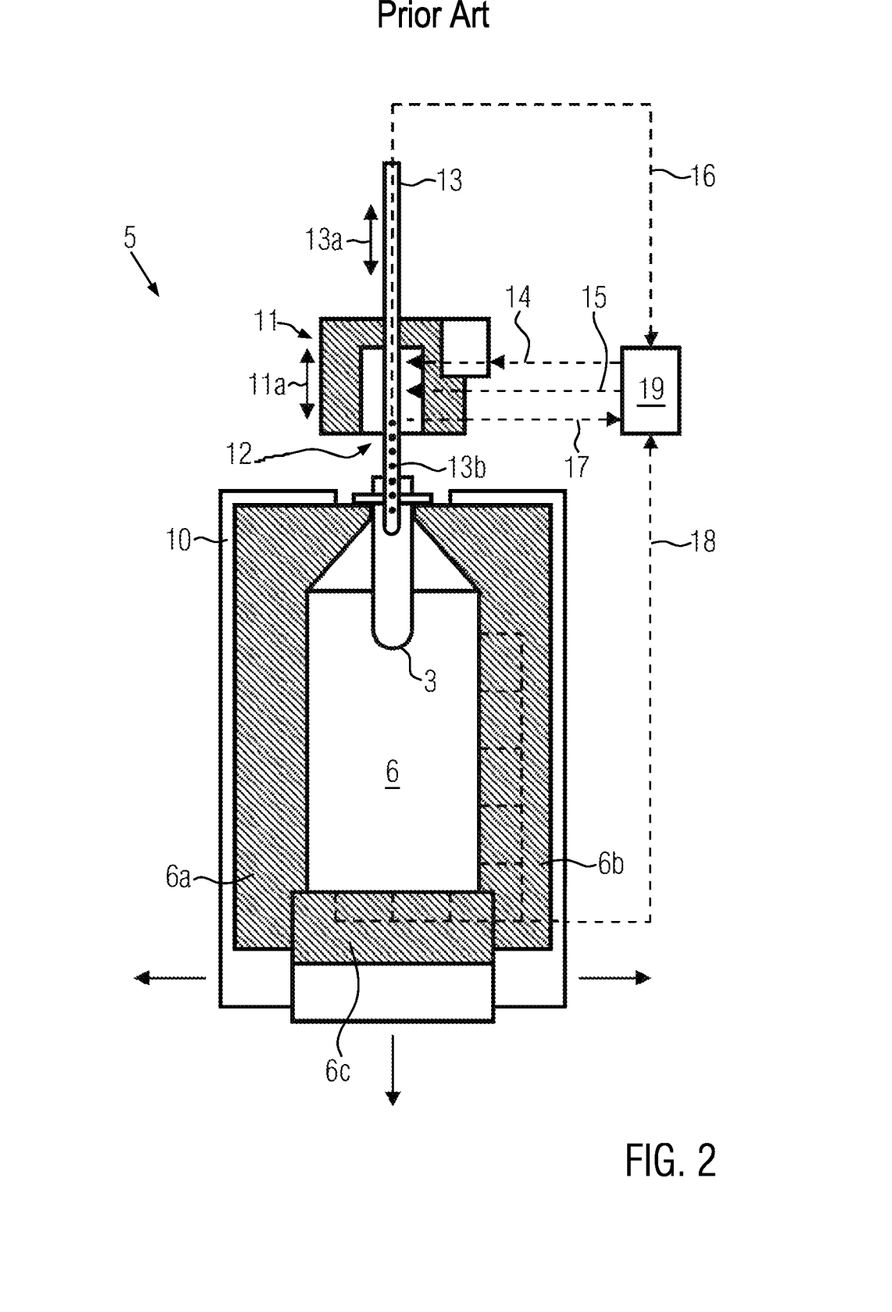
FIG. 2 shows a cross-section view of a treatment station of the form-filling machine according to FIG. 1.

FIG. 2 shows a detailed view of the treatment station 5 of the form-filling machine 1 according to FIG. 1.

The treatment station 5 comprises: mold parts 6a-6c of the hollow mold 6, a multi-part mold carrier 10, valve head 11 (with a lift 11a of the valve unit with respect to the hollow mold), fluid nozzle 12 (equivalent to a blowing nozzle), a stretching rod 13 (with channel), whereby a lift of the stretching rod in relation to the valve unit is indicated with 13a, and whereby apertures (to siphon off the molding fluid, if appropriate also for the supply with molding fluid/product components) are indicated with 13b, a feed line 14 for the molding fluid (with valve), a feed line 15 for the product (with valve), a hydraulic suction line 16 for the molding fluid (with valve), a pneumatic suction line 17 for the inside of the container during filling (with valve), a pneumatic suction line 18 for the hollow mold/outside of the container during filling (with valve), a media distributor 19 (joint rotary distributor for the treatment stations), and a compressor 20 for the molding fluid.

Figure 3:
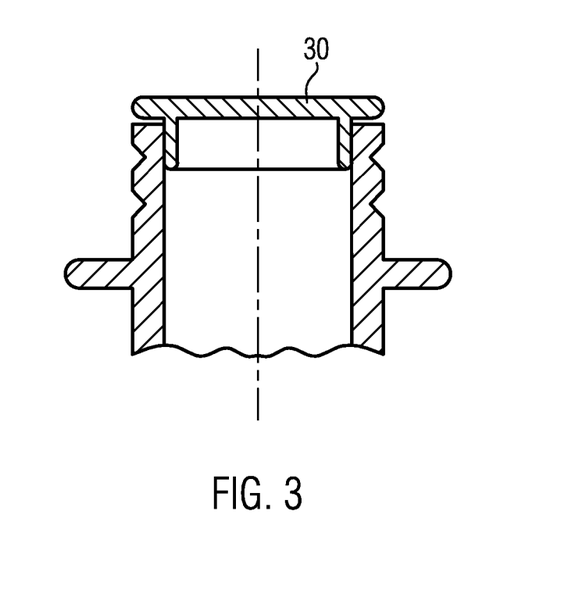
FIG. 3 shows a cross-section view of a bottle outlet with a superimposed pre-closure.

FIG. 3 shows a cross-section of a bottle outlet with a superimposed pre-closure 30. The pre-closure 30 is set upon the outlet of the filled container by means of the closure unit after molding and filling of the container whereby the liquid is prevented from slopping out during transfer to the discharge unit. As the blowing process is implemented with a hot product and as the liquid cools down during transportation in the treatment station, there will be a minor negative pressure that keeps the closure on the outlet.

Figure 4:
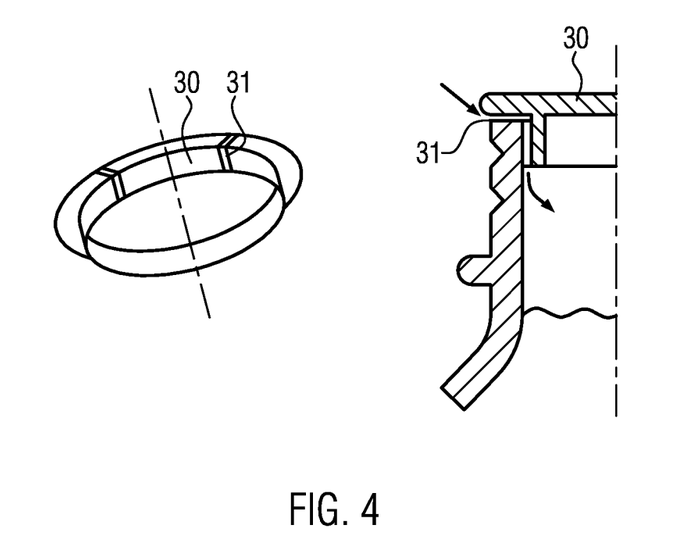
FIG. 4 shows the pre-closure according to FIG. 3 with vertical degasification slots on the circumferential surface.

FIG. 4 shows the pre-closure according to FIG. 3 with vertical degasification slots 31 on the circumferential surface.

Figure 5:
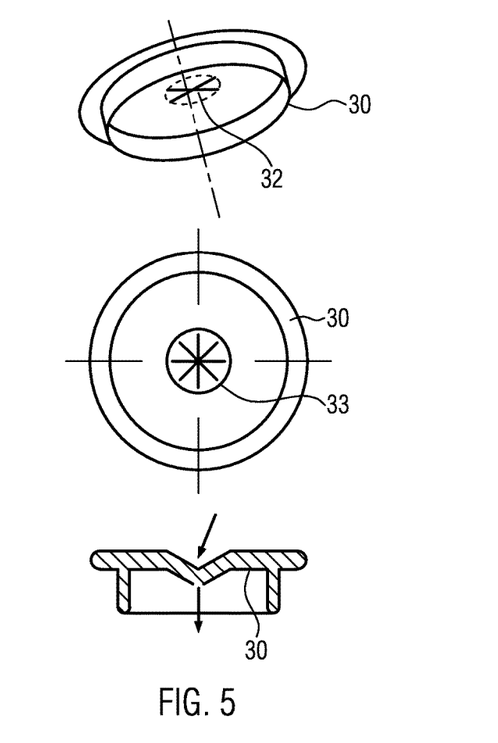
FIG. 5 shows the pre-closure according to FIG. 3 with star-shaped and/or cross-shaped discharge slots at the center of the closure.

FIG. 5 shows the pre-closure according to FIG. 3 with star-shaped and/or cross-shaped discharge slots 33 and/or 32 in the center of the closure. Here, the closure has small ventilation apertures and/or ventilation slots through which a gas exchange is enabled during cooling so that the container does not collapse due to the emerging negative pressure. Such a closure in the sense of a pre-closure can be taken back off prior to the installation of the final closure and transported back to the filling discharge system or remain on the container.

Figure 6:
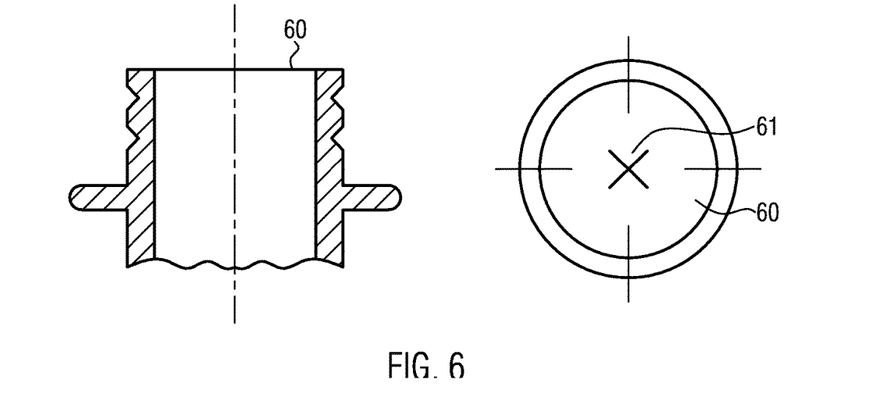
FIG. 6 shows the cross-section of a bottle outlet with a welded foil.

FIG. 6 shows the cross-section of a bottle outlet with a welded foil 60. The foil can have, for example, cross-shaped degasification slots 61.

Figure 7:
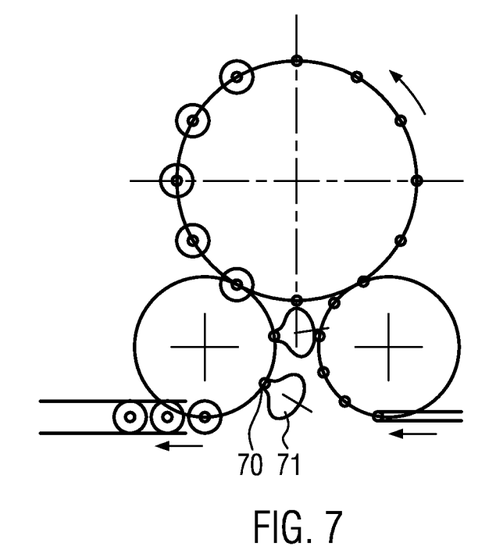
FIG. 7 shows the concept of a discharge unit with oscillating containers.

FIG. 7 shows the concept of a discharge unit in the shape of a discharge star wheel with a swivel bracket 70 of the containers 71.

Figure 8:
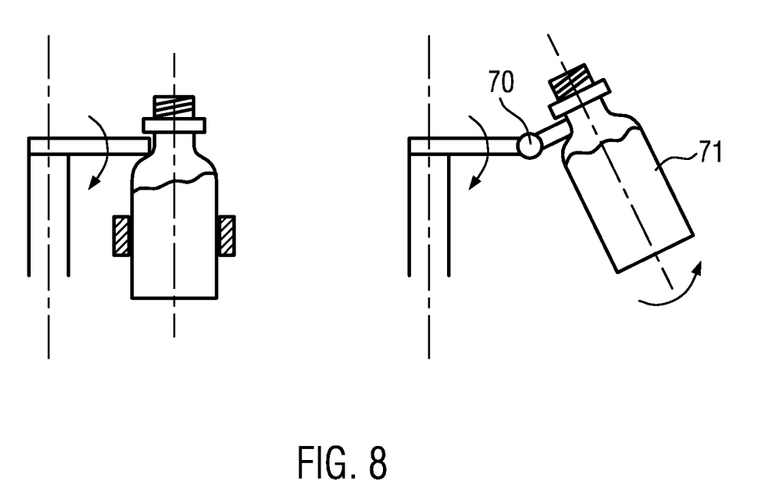
FIG. 8 shows a cross-section of the discharge unit according to FIG. 7.

FIG. 8 shows on the right a cross-section view of the discharge unit according to FIG. 7. The left side of FIG. 8 indicates the inclined liquid surface in a discharge star wheel according to the state of the art. As the form-filling machine always runs with the same speed, the type and structure of the liquid surface is always nearly identical for a specific product. Based on the specific structure and by means of a discharge star wheel, in which the container swivels along in a defined way with the inclination of the emerging liquid surface, a slop-over effect can be prevented. The inclination can adjust itself due to the centripetal and gravitational force impacting on the container, or the inclination can be predetermined alongside a discharge path of the discharge unit due to a mechanical guiding system in the discharge star wheel. Furthermore, there can be a control unit to emit a control signal to control the inclination of the swivel bracket alongside a discharge path of the discharge star wheel, as well as in addition or alternatively a camera to monitor the inclination. Triggering can therefore occur in a fully automated and adaptable way as an electric curve and, if required, even readjustably in real time by means of camera technology.

Figure 9:
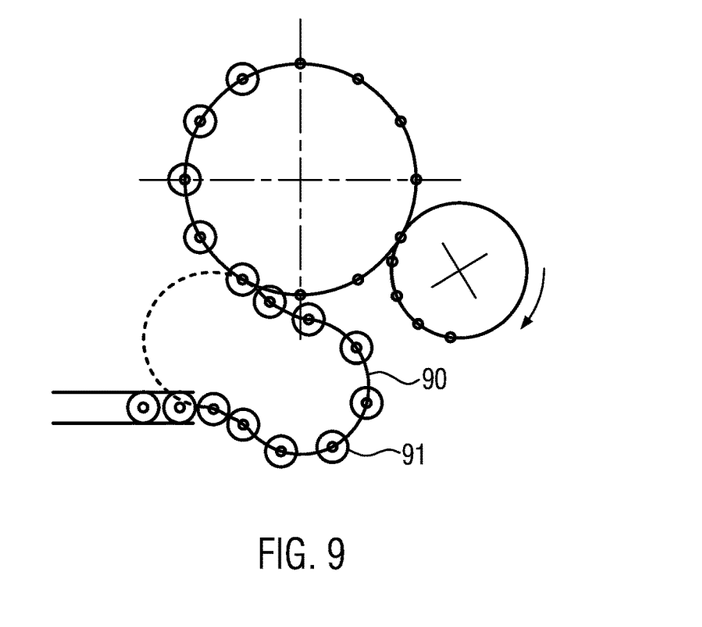
FIG. 9 shows a path-optimized container outlet in the discharge unit.

FIG. 9 shows a path-optimized container outlet 90 in the discharge unit. Here, the slop-over protection system comprises a discharge path of the containers 91 in the discharge unit, that deviates from the circular path, in particular with a section of the discharge path that extends from a transfer point between the treatment station and the discharge unit in a tangential direction. This way, the centripetal force acting in the treatment station is prevented from being momentarily transformed into an opposite centripetal force in the discharge star wheel during the transfer, whereby a slop-over effect is reduced. A gradual transition from the curvature of the circular path in the treatment station to an opposite curvature of the discharge path is particularly preferred. In other words, a part of the discharge path still continues after the transfer point with a curvature direction as prior to and/and or during the transfer.

Figure 10:
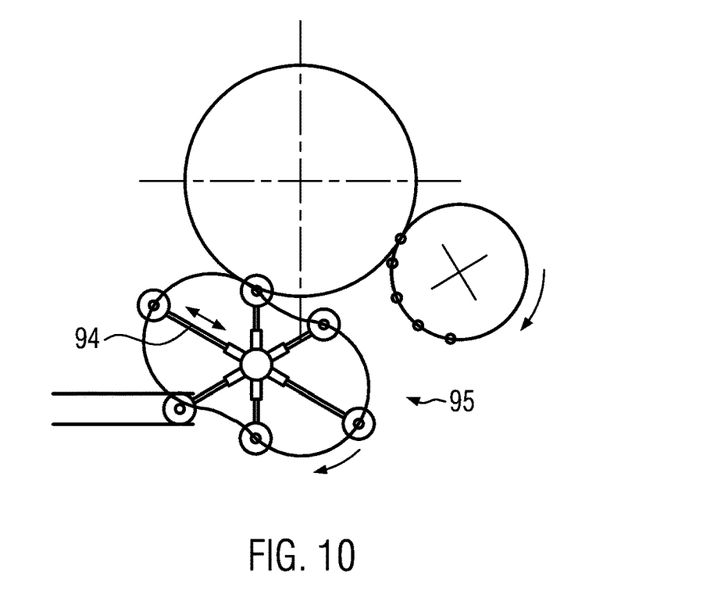
FIG. 10 shows a multi-axis discharge star wheel.

FIG. 10 shows a multi-axis discharge star wheel 95. In this variant, such a slop-over protection device with a path-optimized container outlet is implemented by means of the slop-over protection device continuing to comprise at least one bracket 94 for the container, that is installed tiltably around a swivel axis, whereby a distance between the supported container and the pivot point is variable, in particular by means of a connection element that is adjustable in terms of its length and to a limited extent in terms of its angle. This corresponds to a multi-axis discharge star wheel 95 with an adjustable radius that enables path speeds of the containers, which are relatively independent of the path radius, due to appropriate swivel kinematics.

Figure 11:
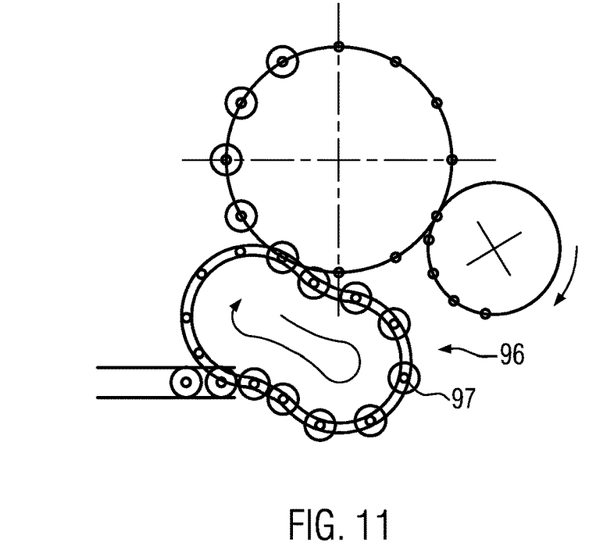
FIG. 11 shows a single carriage system.

FIG. 11 shows a single carriage system 96. In this variant, the discharge unit comprises several single carriages 97 for the respective input of the container, whereby the single carriages are arranged on at least one guiding rail and driven by a strap or a chain. Ideally, the single carriages are not coupled with each other and the respective carriage speeds can be controlled separately. This way, each single carriage can move along the predefined path while being driven individually. Consequently, not only the path course but also the speed and acceleration progression can be adapted and variable. Due to this, the centrifugal force impacting on the liquid in the container, in particular its maximum values in the course of the discharge path, can be minimized.

Figure 12:
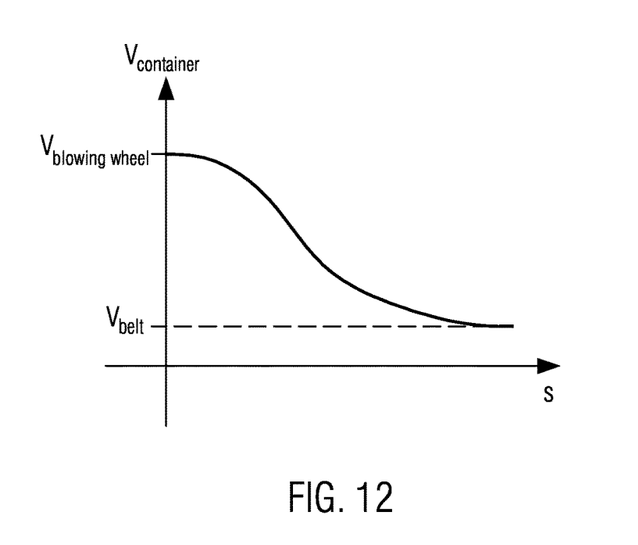
FIG. 12 shows a path-speed diagram with an optimized curve.

FIG. 12 shows a path-speed diagram with an optimized curve. Thereby, the speed of the container vcontainer is gradually reduced along the way s of the path from the speed vblowing wheel in the blowing wheel of the form-filling machine to the speed vbelt of the discharge belt.

The invention claimed is:

1. A form-filling machine to mold and fill a plastic container with a liquid in a treatment station, comprising:
    a container form-filling machine with at least one treatment station for the expanding reshaping of plastic preforms into plastic containers in a hollow mold and for filling a substantially liquid product or at least a liquid or solid component of the products into the formed plastic containers, and
    a slop-over protection device formed to prevent the filling liquid from slopping out of the container during the transition of the container filled with the filling liquid from the treatment station into a discharge unit;
    and the slop-over protection device comprises:
    a circular path for the containers in the treatment station, and
    the discharge path comprises a section that extends from a transfer point between the treatment station and the discharge unit with a gradual transition from the curvature of the circular path in the treatment station to an opposite curvature of the discharge path, wherein a part of the discharge path continues after the transfer point with a curvature direction that is the same as before the transfer point, the slop-over protection device comprises a closure unit to superimpose a closure onto an outlet of the container that is molded in the treatment station and filled with the liquid, the closure having at least one gas exchange aperture comprising one of a slot on one edge of the closure, a star-shaped or a cross-shaped slot in the closure, and a combination thereof.

2. The form-filling machine according to claim 1, and the star-shaped or cross-shaped slot is in the center of the closure.

3. A form-filling machine to mold and fill a plastic container with a liquid in a treatment station, comprising:
    a container form-filling machine with at least one treatment station for the expanding reshaping of plastic preforms into plastic containers in a hollow mold and for filling a substantially liquid product or at least a liquid or solid component of the products into the formed plastic containers, and
    a slop-over protection device formed to prevent the filling liquid from slopping out of the container,
    and the slop-over protection device comprises:
    a closure unit to superimpose a closure onto an outlet of the container that is molded in the treatment station and filled with the liquid,
    and the closure has at least one gas exchange aperture,
    and the gas exchange aperture comprises one of a slot on one edge of the closure, a star-shaped or a cross-shaped slot in the closure, and a combination thereof.

* * * * *